June 18, 1940.  W. F. MERCER  2,204,943
GENERATOR DRIVE
Filed May 20, 1939

Walter F. Mercer, INVENTOR
BY Victor J. Evans & Co.
ATTORNEYS

Patented June 18, 1940

2,204,943

UNITED STATES PATENT OFFICE 2,204,943

GENERATOR DRIVE

Walter F. Mercer, Satanta, Kans.

Application May 20, 1938, Serial No. 209,154

1 Claim. (Cl. 74—11)

This invention relates to generator drives and has for an object to provide a novel drive mechanism for connecting the governor shaft of a tractor to a generator which may be conveniently used for supplying current to headlights when the tractor is to be used at night and which may be removed when not needed.

A further object is to provide a drive of this character which will be formed of a few strong, simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1:
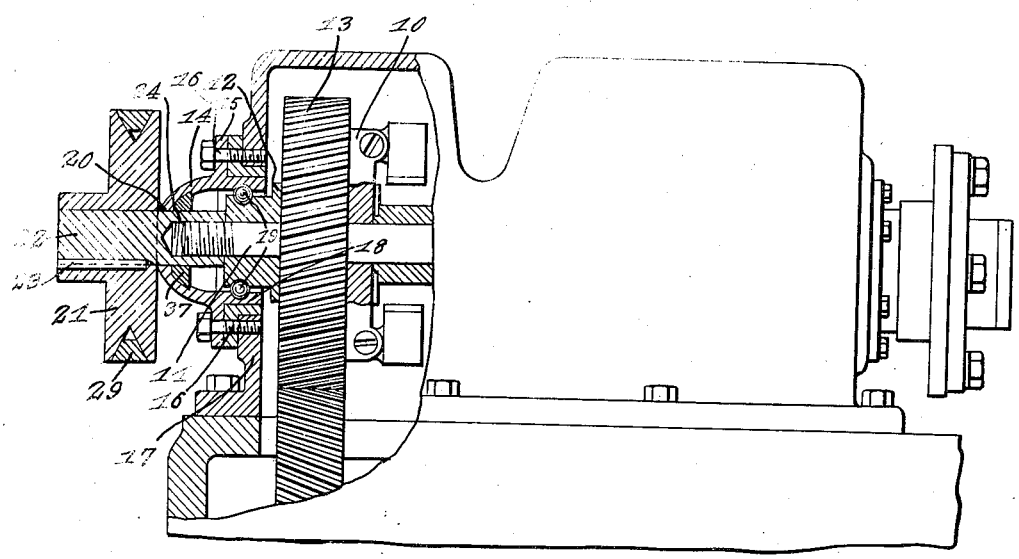
Figure 1 is a rear elevation of a tractor generator with parts exposed to show a generator drive constructed in accordance with the invention applied thereto.
Figure 2:
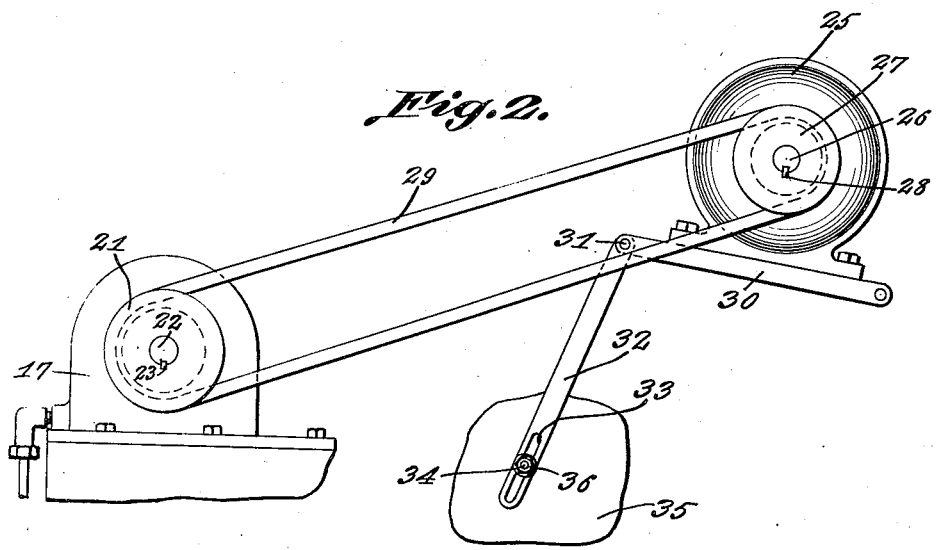
Figure 2 is a side elevation showing the generator drive and generator, the latter being adapted to be adjustably mounted on the side of the tractor.

Referring now to the drawing in which like characters of reference designate similar parts in the various views, 10 designates the conventional governor for a tractor, the same having a shaft 11 which is keyed to the hub 12 of the driving worm gear 13 of the governor. A cylindrical cap 14 having a rounded end wall is provided with a flange 15 which is bolted as shown at 16 to the governor casing 17 and holds in place a seat 18 for ball bearings 19.

The above parts are conventional with the exception that a retaining nut is screwed on to the end of the governor shaft 11 and is housed by the cap 14.

In carrying out the invention the above referred to nut is removed. Also a bearing opening 20 is formed centrally in the rounded end wall of the cap 14 and extends across the end of the governor shaft 11. A pulley 21 is keyed to a stub shaft 22, as shown at 23. The stub shaft extends through the opening 20 in the cap and is provided with an internally threaded bore 24 which receives the threaded end of the governor shaft 11. The stub shaft 22 performs, in addition to the function of the nut which it replaces, the function of mounting the pulley 21 to be driven by the governor shaft 11 for driving a conventional generator 25.

The generator is equipped with a shaft 26 having a pulley 27 keyed thereto as shown at 28. A belt 29 connects the pulley 21 on the governor shaft with the pulley 27 of the generator.

The generator is bolted to a base 30 which is hingedly connected by a pivot bolt 31, at the front end, to an upwardly and rearwardly inclined lever 32 having a longitudinal slot 33 at the lower end through which an adjusting bolt 34 projects. The bolt is mounted on a suitable part of the tractor 35. By loosening the nut 36 of the adjusting bolt the lever arm 32 may be slid downwardly on the adjusting bolt to slack the belt 29 and permit removal of the belt when the generator is not needed. Manipulation of the single adjusting bolt 34 attaches the generator to the tractor when it is needed, and permits removal of the generator from the tractor when it is not needed.

A felt washer 37 surrounds the inner hollow end of the stub shaft and is confined against the inner face of the rounded end wall of the cap and seals the bearing opening 20 in the cap 14.

From the above description it is thought that the construction and operation of the invention will be fully understood without further explanation.

What is claimed is:

A power takeoff comprising a driven shaft, a casing for the shaft, a cylindrical cap bolted to the casing, said cap having a rounded end wall spaced from the end of the shaft, there being a bearing opening formed centrally in the rounded end wall in alignment with the shaft, a stub shaft rotatingly mounted in the bearing opening and extending through the opening at both ends, a hub on the shaft, ball bearings between the hub and the cylindrical cap, the inner end of the stub shaft having an internally threaded bore, the end of said driven shaft being threaded and being received in said bore, a pulley secured to the outer end of the stub shaft, and a packing washer surrounding the stub shaft and confined against the inner face of the rounded end wall at said bearing opening to seal said bearing opening.

WALTER F. MERCER.